(12) United States Patent
Wang et al.

(10) Patent No.: US 8,685,123 B2
(45) Date of Patent: Apr. 1, 2014

(54) ABRASIVE PARTICULATE MATERIAL, AND METHOD OF PLANARIZING A WORKPIECE USING THE ABRASIVE PARTICULATE MATERIAL

(75) Inventors: Jun Wang, Worcester, MA (US); Andrew G. Haerle, Sutton, MA (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 1493 days.

(21) Appl. No.: 11/251,633

(22) Filed: Oct. 14, 2005

(65) Prior Publication Data

US 2007/0084134 A1 Apr. 19, 2007

(51) Int. Cl.
*C09K 3/14* (2006.01)
*C01F 7/02* (2006.01)

(52) U.S. Cl.
USPC .............................................. 51/307; 423/625

(58) Field of Classification Search
USPC ..................................... 51/293, 309; 423/625
See application file for complete search history.

(56) References Cited

U.S. PATENT DOCUMENTS

| | | | |
|---|---|---|---|
| 4,318,896 A * | 3/1982 | Schoonover | 423/628 |
| 4,797,139 A | 1/1989 | Bauer | |
| 4,835,124 A | 5/1989 | Pearson | |
| 5,302,368 A | 4/1994 | Harato et al. | |
| 5,348,920 A * | 9/1994 | Sugimoto et al. | 501/153 |
| 5,413,985 A | 5/1995 | Thome et al. | |
| 5,527,423 A | 6/1996 | Neville et al. | |
| 5,693,239 A * | 12/1997 | Wang et al. | 216/88 |
| 5,697,992 A | 12/1997 | Ueda et al. | |
| 5,804,513 A | 9/1998 | Sakatani et al. | |
| 6,194,317 B1 | 2/2001 | Kaisaki et al. | |
| 6,440,187 B1 * | 8/2002 | Kasai et al. | 51/309 |
| 6,706,082 B2 | 3/2004 | Ota et al. | |
| 2003/0064020 A1 * | 4/2003 | Kogoi et al. | 423/625 |
| 2004/0040217 A1 * | 3/2004 | Takashina et al. | 51/307 |
| 2005/0033101 A1 * | 2/2005 | Voskoboynikov et al. | 585/660 |
| 2005/0194358 A1 | 9/2005 | Chelle | |
| 2005/0201928 A1 * | 9/2005 | Maki et al. | 423/625 |

FOREIGN PATENT DOCUMENTS

| | | |
|---|---|---|
| CA | 2070607 | 12/1992 |
| EP | 51 81 06 A1 | 12/1992 |
| EP | 1256548 A1 | 11/2002 |
| JP | 04193712 A | 7/1992 |
| JP | 10-125638 A | 5/1998 |
| JP | 11-268911 A | 10/1999 |
| JP | 2000-129243 A | 5/2000 |
| JP | 2001-064685 A | 3/2001 |
| JP | 2007-522062 A | 8/2007 |
| JP | 2008-543577 A | 12/2008 |
| WO | 97/13889 A1 | 4/1997 |
| WO | 2006060206 A1 | 6/2006 |
| WO | 2007047547 A3 | 4/2007 |

OTHER PUBLICATIONS

Singer, P., Semiconductor International, Oct. 1, 2004 http://www.reed-electronics.com/semiconductor/article/CA456650?text=praesagus.

Wang, Y.G. et al., "Phase Transformation in Nanometer-Sized Gamma-Alumina by Mechanical Milling", Journal of the American Ceramic Society, 2005, vol. 88, No. 3, pp. 780-783.

Yajima, Y. et al., "Pulse Electric Current Sintering and Strength of Sintered Alumina Using Gamma-Alumina Powders Prepared by the Sol-Gel Method", Journal of Ceramic Society of Japan, vol. 111, No. 6, pp. 419-425.

Mackenzie, K.J.D. et al.; Effect of Mechanochemicl Activation on the Theramal Reactions of Boehmite (gamma-AlOOH) and gamma-Al2O3; Thermochimica Acta; 2000, vol. 359, No. 1, pp. 87-94.

Yokota, K. et al., "Influence of Polyacrylic Ammonium Addition on Submicron Grinding of alpha-Alumina Powder using Wet Rotation Ball Milling", Journal of the Ceramic Society of Japan, vol. 106, No. 11, pp. 1144-1146, 1998.

Hart, L.D. "Alumina Chemicals" Westerville, 1990, pp. 18-19. (XP002429051).

* cited by examiner

*Primary Examiner* — Pegah Parvini
(74) *Attorney, Agent, or Firm* — Mike W. Crosby; Abel Law Group, LLP

(57) ABSTRACT

An abrasive particulate material is disclosed that includes alumina particles. The alumina particles include a transition alumina and at least 5.0 wt % of an amorphous phase. The transition alumina particles also have a density not greater than about 3.20 g/cm$^3$.

22 Claims, 6 Drawing Sheets

ABRASIVE PARTICULATE MATERIAL, AND METHOD OF PLANARIZING A WORKPIECE USING THE ABRASIVE PARTICULATE MATERIAL

BACKGROUND

1. Field of the Disclosure

The present disclosure is directed generally to abrasive particulate materials and particularly, abrasive particulate materials for use in polishing applications and other applications.

2. Description of the Related Art

Abrasive particulate materials are used in a wide range of applications, for example grinding, polishing and finishing surfaces in a variety of applications. Abrasive powders can be utilized in dry or wet form, wherein utilizing the abrasive powders in a wet form typically requires the dispersion of the powder in a solvent to create an abrasive slurry. Particular abrasive slurries are commonly used in polishing applications, such as chemical mechanical planarization (CMP) in the semiconductor device manufacturing industry.

Characteristics of abrasives relevant to polishing applications, such as CMP include material removal rate, selectivity and defectivity. Material removal rate is a measure of the capability of the abrasive slurry to remove material, over a length of time under fixed polishing conditions. Selectivity is a measure of the ability of the slurry to remove one type of material (e.g., a metal), while leaving a portion or substantial portion of another material intact (e.g., a dielectric). The selectivity of an abrasive slurry is particularly relevant in the semiconductor device manufacturing industry where it is desirable to uncover layers, or portions of layers, underlying a layer of different material, leaving behind a planar composite surface.

A common problem associated with slurries is that the particles are predisposed to settling or forming an unstable suspension. Often, additives or other stabilizers are added to the slurry to improve the stability and hold the particles in suspension. However, shipping and storing a stabilized slurry are expensive and cumbersome propositions because of the additional weight of the water and additives. As such, it is not preferable to ship and/or store slurries. Naturally, the extra processing and additional materials added to a slurry to stabilize or re-stabilize the suspension are costs that ideally could be reduced or avoided.

One industry approach focuses on improving material removal rates and reducing polishing times, and as such, has made use of the high temperature phase of alumina, alpha alumina. Alpha alumina may be formed through conversion of an aluminous precursor, typically at a temperature on the order of 1000° C. to 1200° C. See, for example, Harato et al. (U.S. Pat. No. 5,302,368) and Kaisaki et al. (U.S. Pat. No. 6,194,317). Alpha alumina may be formed at lower temperatures by thermally converting a hydrated form of alumina to a transition phase (gamma phase) alumina and grinding to seed the transition phase with a corundum phase (alpha alumina). See "Effect of mechanochemical activation on the thermal reactions of boehmite (γ-AlOOH) and γ-$Al_2O_3$", MacKenzie, K. J. D., Temuujin, J, Smith, M. E., Angerer, P., Kameshima, Y., Thermochimica Acta 359 (2000) 87-94.

Abrasive compounds containing primarily alpha alumina are useful in polishing metal surfaces at high material removal rates. While alpha alumina is the hardest phase of polycrystalline alumina and provides a desirably high material removal rate, its use is limited to certain applications due to poor selectivity and tendencies to produce undesirable surface defects such as scratches and orange peel.

In an effort to reduce the surface defects and poor selectivity of slurries containing primarily alpha alumina particles, softer forms of abrasive particles (e.g., aluminum hydroxides and transition aluminas) have been combined with alpha alumina particles. See for example, Wang et al. (U.S. Pat. No. 5,693,239). However, such slurries have been characterized as having limited specific surface area, and testing has revealed generation of considerable surface defects in CMP applications.

Other abrasives compounds and abrasive slurries have been formed to contain principally softer crystalline particles (relative to alpha alumina, such as transition aluminas). See for example, Chelle (U.S. Pub. No. 2005/0194358), which discloses a high purity fumed gamma alumina particles. Still, other abrasives have included softer alumina crystalline particles in addition to other compounds, such as cerium oxide. See for example, Sakatani et al. (U.S. Pat. No. 5,804,513) and Ueda et al. (U.S. Pat. No. 5,697,992). Such materials are generally heterogeneous (having both alumina and another metal oxide), are limited to gamma transition alumina particles, and have low specific surface areas and large particle sizes, characteristics that affect the polishing performance and stability of the material in a slurry.

The art has also combined amorphous phase aluminum oxide and a crystalline transition alumina phase. See for example, Neville et al. (U.S. Pat. No. 5,527,423) which discloses a material containing an amorphous phase and a gamma alumina phase. Such material is characterized by a high dry powder density. Inspection of actual samples obtained in accordance with the disclosure of the '423 patent has revealed a powder density of 3.78 g/$cm^3$, which impacts slurry stability and polishing performance.

The art has also reported gamma phase transition alumina with limited chi phase transition alumina. See for example, Thome et al., U.S. Pat. No. 5,413,985 disclosing a process of shock calcining hydragillite to form a partially crystalline transition alumina of both 4-fold and 5-fold coordination.

The industry continues to demand abrasive particulate materials that provide high selectivity with attendant desirable material removal rates. In addition, the industry also needs materials that are capable of being stored or shipped in dry form and capable of being dispersed in a solvent to form a stable, ready-to-use slurry with minimal stabilizing processing. Alternatively, instead of dry powder, the industry would benefit from alumina suspensions that are colloidally stable (exhibiting little or no sedimentation after extended periods).

SUMMARY

According to one embodiment an abrasive particulate material includes alumina particles comprising transition alumina and at least 5.0 wt % of an amorphous phase, the alumina particles having a density not greater than about 3.20 g/$cm^3$.

According to another embodiment an abrasive particulate material includes alumina particles comprising transition alumina and at least 5.0 wt % of an amorphous phase, wherein the transition alumina includes theta phase and at least one of gamma phase and delta phase.

According to another embodiment a method of forming an abrasive particulate material includes providing feedstock particles containing principally transition alumina, and milling the feedstock particles to form alumina particles. The alumina particles include transition alumina and not less than about 5.0 wt % of an amorphous phase, the alumina particles having a density not greater than about 3.20 g/cm$^3$.

According to another embodiment a method of polishing a conductive metal surface of a workpiece includes providing an abrasive slurry between a workpiece and a platen for polishing, the abrasive slurry comprising a solvent and alumina particles, the alumina particles comprising transition alumina and not less than about 5 wt % of an amorphous phase, wherein the alumina particles have a density not greater than about 3.20 g/cm$^3$. Further, the method includes translating the platen and the workpiece relative to each other.

According to another embodiment a particulate material includes alumina particles comprising transition alumina having a turbidity of not greater than about 200 NTU, wherein turbidity is measured at a concentration of 0.50 wt % alumina particles in water.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
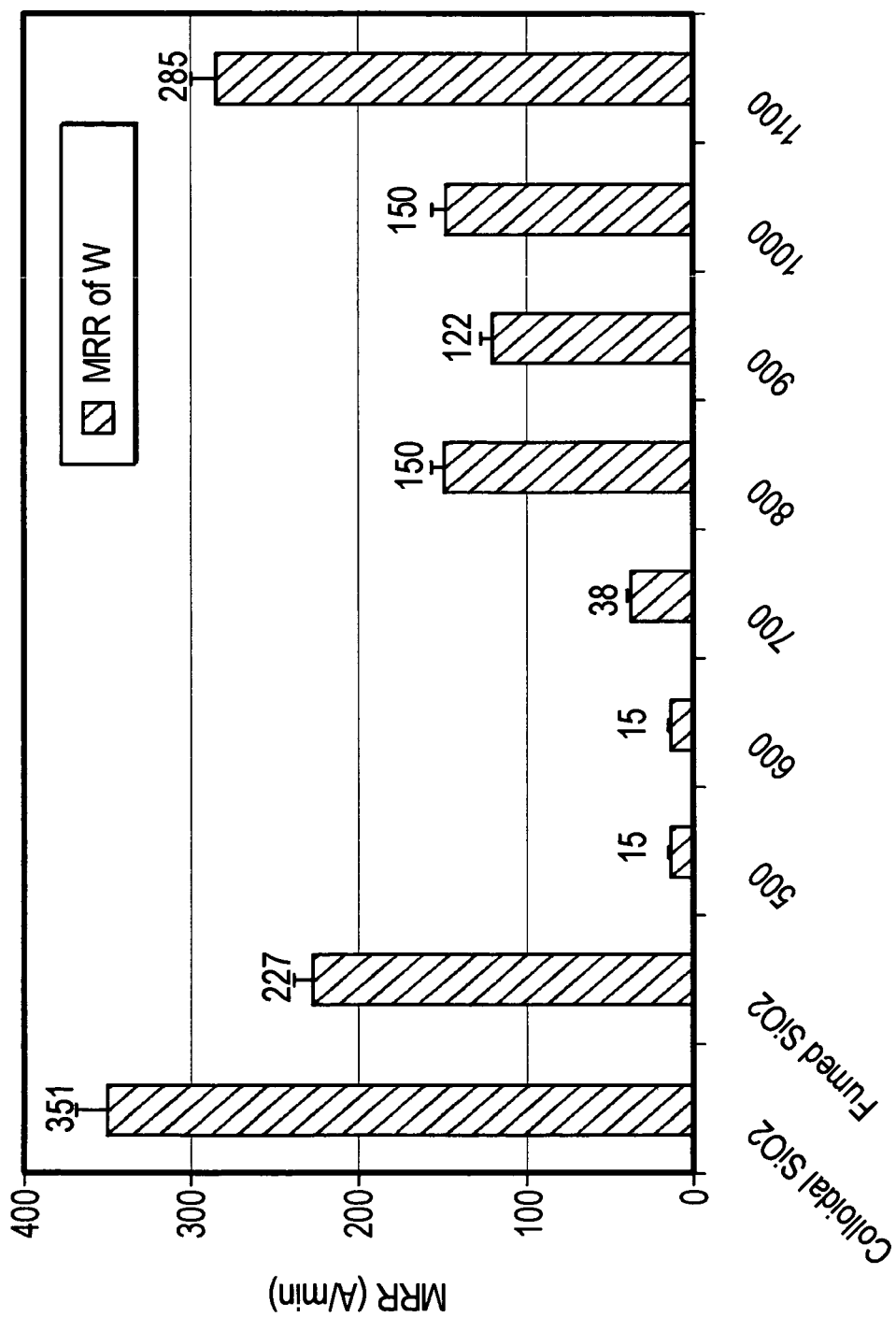
FIG. 1 illustrates a bar graph detailing the material removal rates of commercially available silica and a variety of slurries containing alumina particles calcined at different temperatures on a tungsten (W) surface.

According to one embodiment, synthesis of an abrasive particulate material is provided that includes providing feedstock particles and milling the feedstock particles to produce an abrasive particulate material containing transition alumina. The feedstock particles generally are formed principally of transition alumina, and may be produced through a boehmite conversion process such as through a seeded processing pathway.

Seeded processing includes providing a boehmite precursor and boehmite seeds in a suspension, and heat-treating (such as by hydrothermal treatment) the suspension (alternatively sol or slurry) to convert a boehmite precursor into boehmite particulate material formed of particles or crystallites. Heat treatment is then carried out to the boehmite particulate material to effect polymorphic transformation into transition alumina forming the feedstock particles. According to one aspect, the boehmite particulate material has a relatively elongated morphology, described generally herein in terms of primary (and secondary) aspect ratio and described in more detail below, and the morphology of the boehmite is largely preserved in the feedstock particulate material.

The term "boehmite" is generally used herein to denote alumina hydrates including mineral boehmite, typically being $Al_2O_3 \cdot H_2O$ and having a water content on the order of 15%, as well as psuedoboehmite, having a water content higher than 15%, such as 20-38% by weight. It is noted that boehmite (including psuedoboehmite) has a particular and identifiable crystal structure, and accordingly unique X-ray diffraction pattern, and as such, is distinguished from other aluminous materials including other hydrated aluminas such as ATH (aluminum trihydroxide) a common precursor material used herein for the fabrication of boehmite particulate materials.

Primary aspect ratio is defined as the ratio of the longest dimension to the next longest dimension perpendicular to the longest dimension and is generally not less than 2:1, and preferably not less than 3:1, 4:1, or 6:1. Indeed, the boehmite particulate material in certain embodiments has relatively elongated particles, having primary aspect ratios not less than 8:1, 10:1, and in some cases, not less than 14:1. With particular reference to needle-shaped particles, the particles may be further characterized with reference to a secondary aspect ratio defined as the ratio of the second longest dimension to the third longest dimension. The secondary aspect ratio is generally not greater than 3:1, typically not greater than 2:1, or even 1.5:1, and oftentimes about 1:1. The secondary aspect ratio generally describes the cross-sectional geometry of the particles in a plane perpendicular to the longest dimension. It is noted that since the term aspect ratio is used herein to denote the ratio of the longest dimension to the next longest dimension, it may be referred as the primary aspect ratio.

According to another embodiment, boehmite platey or platelet-shaped particles generally have an elongated structure having the primary aspect ratios described above in connection with the needle-shaped particles. However, platelet-shaped particles generally have opposite major surfaces, the opposite major surfaces being generally planar and generally parallel to each other. In addition, the platelet-shaped particles may be characterized as having a secondary aspect ratio greater than that of needle-shaped particles, generally not less than about 3:1, such as not less than about 6:1, or even not less than 10:1. Typically, the shortest dimension or edge dimension, perpendicular to the opposite major surfaces or faces, is generally not greater than 50 nanometers, such as not greater than about 40 nanometers, or not greater than about 30 nanometers.

The morphology of the boehmite particulate material may be further defined in terms of particle size, more particularly, average particle size. In one embodiment, the boehmite material is a seeded boehmite particulate material, that is, boehmite formed through a seeding process (described in more detail below) has a relatively fine particle or crystallite size. Generally, the average boehmite material particle size is not greater than about 1000 nanometers, and fall within a range of about 100 to 1000 nanometers. Other embodiments have even finer average particle sizes, such as not greater than about 800 nanometers, 750 nanometers, 600 nanometers, 500 nanometers, 400 nanometers, and even particles having an average particle size smaller than 300 nanometers, representing a fine particulate material. In the context of fine boehmite particulate material, embodiments were shown to have a particle size smaller than 250 nanometers, such as not greater than 225 nanometers. One range for average boehmite material particle size lies within a range of 150 to 200 nanometers. Due to process constraints of certain embodiments, the smallest average particle size is generally limited, such as not less than about 75 nanometers, 100 nanometers (particularly in the case of platy precursor particulate material a minimum particle size of 110 nanometers), 125 nanometers, or 135 nanometers.

As used herein, the "average particle size" in connection with high aspect ratio boehmite particulate material is used to denote the average longest or length dimension of the particles. Due to the elongated morphology of such embodiments, conventional characterization technology is generally inadequate to measure average particle size, since characterization technology is generally based upon an assumption that the particles are spherical or near-spherical. Accordingly, average particle size was determined by taking multiple representative samples of the boehmite particulate material and physically measuring the particle sizes found in representative samples. Such samples may be taken by various characterization techniques, such as by scanning electron microscopy (SEM). The term average particle size also denotes primary particle size, related to the individually identifiable particles, whether dispersed or agglomerated forms. Of course, agglomerates have a comparatively larger average particle size, and for the purposes of referencing the boehmite material, the present disclosure does not focus on agglomerate sizing.

In one embodiment, the seeded boehmite particulate material has been found to have a fine average particle size. In this regard, it is noted that oftentimes in the literature, reported particle sizes are not set forth in the context of averages as in the present specification, but rather, in the context of nominal range of particle sizes derived from physical inspection of samples of the boehmite material. Accordingly, the average particle size will lie within the reported range in the prior art, generally at about the arithmetic midpoint of the reported range, for the expected Gaussian particle size distribution. Stated alternatively, while prior art technologies may report fine particle size, such fine sizing generally denotes the lower limit of an observed particle size distribution and not average particle size.

Likewise, in a similar manner, the above-reported aspect ratios generally correspond to the average aspect ratio taken from representative sampling, rather than upper or lower limits associated with the aspect ratios of the precursor particulate material. Oftentimes in the literature, reported particle aspect ratios are not set forth in the context of averages as in the present specification, but rather, in the context of nominal range of aspect ratios derived from physical inspection of samples of the particulate material. Accordingly, the average aspect ratio will lie within the reported range in the prior art, generally at about the arithmetic midpoint of the reported range, for the expected Gaussian particle morphology distribution. Stated alternatively, while non-seeded based technologies may report aspect ratio, such data generally denotes the lower limit of an observed aspect ratio distribution and not average aspect ratio.

In addition to aspect ratio and average particle size of the boehmite particulate material, morphology of the boehmite particulate material may be further characterized in terms of specific surface area. Here, the commonly available BET technique was utilized to measure specific surface area of the boehmite particulate material. According to embodiments herein, the boehmite particulate material may have a relatively high specific surface area, generally not less than about 10 $m^2/g$, such as not less than about 50 $m^2/g$, 70 $m^2/g$, or not less than about 90 $m^2/g$. Since specific surface area is a function of particle morphology as well as particle size, generally the specific surface area of embodiments was less than about 400 $m^2/g$, such as less than about 350 or 300 $m^2/g$. Specific ranges for surface area are about 75 $m^2/g$ to 200 $m^2/g$.

Turning to the details of the processes by which the seeded boehmite particulate material may be manufactured, generally ellipsoid, needle, or platelet-shaped boehmite are formed from a boehmite precursor, typically an aluminous material including bauxitic minerals, by hydrothermal treatment as generally described in the commonly owned patent described above, U.S. Pat. No. 4,797,139. More specifically, the seeded boehmite particulate material may be formed by combining the boehmite precursor and boehmite seeds in suspension, exposing the suspension (alternatively sol or slurry) to heat treatment to cause conversion of the raw material into boehmite particulate material, further influenced by the boehmite seeds provided in suspension. Heating is generally carried out in an autogenous environment, that is, in an autoclave, such that an elevated pressure is generated during processing. The pH of the suspension is generally selected from a value of less than 7 or greater than 8, and the boehmite seed material has a particle size finer than about 0.5 microns. Generally, the seed particles are present in an amount greater than about 1% by weight of the boehmite precursor (calculated as $Al_2O_3$), and heating is carried out at a temperature greater than about 120° C., such as greater than about 125° C., or even greater than about 130° C., and at a pressure that is autogenously generated, typically around 30 psi.

The precursor particulate material may be fabricated with extended hydrothermal conditions combined with relatively low seeding levels and acidic pH, resulting in preferential growth of boehmite along one axis or two axes. Longer hydrothermal treatment may be used to produce even longer and higher aspect ratio of the boehmite particles and/or larger particles in general.

Following heat treatment, such as by hydrothermal treatment, and boehmite conversion, the liquid content is generally removed, such as through an ultrafiltration process or by heat treatment to evaporate the remaining liquid. Thereafter, the resulting mass is generally crushed, such to 100 mesh. It is noted that the particulate size described herein generally describes the single crystallites formed through processing, rather than the aggregates which may remain in certain embodiments (e.g., for those products that call for an aggregated material).

According to data gathered, several variables may be modified during the processing of the boehmite particulate material, to effect the desired morphology. These variables notably include the weight ratio, that is, the ratio of boehmite precursor to boehmite seed, the particular type or species of acid or base used during processing (as well as the relative pH level), and the temperature (which is directly proportional to pressure in an autogenous hydrothermal environment) of the system.

In particular, when the weight ratio is modified while holding the other variables constant, the shape and size of the particles forming the boehmite particulate material are modified. For example, when processing is carried at 180° C. for two hours in a 2 weight % nitric acid solution, a 90:10 ATH: boehmite seed ratio forms needle-shaped particles (ATH being a species of boehmite precursor). In contrast, when the ATH:boehmite seed ratio is reduced to a value of 80:20, the particles become more elliptically shaped. Still further, when the ratio is further reduced to 60:40, the particles become near-spherical. Accordingly, most typically the ratio of boehmite precursor to boehmite seeds is not less than about 60:40, such as not less than about 70:30 or 80:20. However, to ensure adequate seeding levels to promote the fine particulate morphology that is desired, the weight ratio of boehmite precursor to boehmite seeds is generally not greater than about 98:2. Based on the foregoing, an increase in weight ratio generally increases aspect ratio, while a decrease in weight ratio generally decreased aspect ratio.

Further, when the type of acid or base is modified, holding the other variables constant, the shape (e.g., aspect ratio) and size of the particles are affected. For example, when processing is carried out at 180° C. for two hours with an ATH: boehmite seed ratio of 90:10 in a 2 weight % nitric acid solution, the synthesized particles are generally needle-shaped, in contrast, when the acid is substituted with HCl at a content of 1 weight % or less, the synthesized particles are generally near spherical. When 2 weight % or higher of HCl is utilized, the synthesized particles become generally needle-shaped. At 1 weight % formic acid, the synthesized particles are platelet-shaped. Further, with use of a basic solution, such as 1 weight % KOH, the synthesized particles are platelet-shaped. If a mixture of acids and bases is utilized, such as 1 weight % KOH and 0.7 weight % nitric acid, the morphology of the synthesized particles is platelet-shaped. It will be appreciated that the above weight % values of the acids and bases are based on the solids content only of the respective solid suspensions or slurries, that is, are not based on the total weight % of the total weight of the slurries.

Suitable acids and bases include mineral acids such as nitric acid, organic acids such as formic acid, halogen acids such as hydrochloric acid, and acidic salts such as aluminum nitrate and magnesium sulfate. Effective bases include, for example, amines including ammonia, alkali hydroxides such as potassium hydroxide, alkaline hydroxides such as calcium hydroxide, and basic salts.

Still further, when temperature is modified while holding other variables constant, typically changes are manifested in particle size. For example, when processing is carried out at an ATH:boehmite seed ratio of 90:10 in a 2 weight % nitric acid solution at 150° C. for two hours, the crystalline size from XRD (x-ray diffraction characterization) was found to be 115 Angstroms. However, at 160° C. the average particle size was found to be 143 Angstroms. Accordingly, as temperature is increased, particle size is also increased, representing a directly proportional relationship between particle size and temperature.

According to embodiments described herein, a relatively powerful and flexible process methodology may be employed to engineer desired morphologies into the boehmite particulate material. Of particular significance, embodiments utilize seeded processing resulting in a cost-effective processing route with a high degree of process control which may result in desired fine average particle sizes as well as controlled particle size distributions. The combination of (i) identifying and controlling key variables in the process methodology, such as weight ratio, acid and base species and temperature, and (ii) seeding-based technology is of particular significance, providing repeatable and controllable processing of desired boehmite particulate material morphologies. The foregoing discussion of providing a boehmite particulate material through a seeded boehmite processing pathway relates to one embodiment. In another embodiment the boehmite particulate material can be obtained through an unseeded processing pathway and as such can make use of commercially available boehmite, such as Sasol P2K, Disperal, Disperal 20, 40 and 60. In such as case, the boehmite may have limited anisotropic morphology, and may be generally isotropic unlike embodiments described above.

While the foregoing has focused on a suitable boehmite particulate material and the formation of such, a particular aspect of the present invention involves further processing of the boehmite particulate material into feedstock particulate material containing transition alumina. Here, the boehmite is heat treated by calcination at a temperature sufficient to cause transformation into transition alumina containing principally a transition phase alumina or a combination of transition phases. For purposes of clarification, description of "principally" a transition alumina phase or a combination of transition phases generally corresponds to at least 80 wt. %, generally at least 90 wt. %, such as at least 95 wt. % transition alumina phase(s).

The calcining temperature is dependent, in part, upon the type of boehmite particulate material and the time necessary to convert the boehmite particulate material to transition alumina. Generally, the calcining temperature is not greater than about 1250° C. Other embodiments utilize a calcining temperature not greater than about 1100° C., 1000° C. or even 900° C. Typically, embodiments utilize a calcining temperature not less than about 500° C., such as not less than 600° C., with typical embodiments calcining within a range of about 700° C. to 1100° C.

A suitable time for calcining depends in part upon the boehmite particulate material and the desired composition of the transition alumina material. Typically, calcining is not carried out for greater than about 5 hours, generally within a range of about 1 to 4 hours or 1 to 3 hours. It will be appreciated that the processing guidelines described above are not restrictive and are merely illustrative of possible steps facilitating the formation of a feedstock transition alumina. The resulting feedstock material may be principally composed of transition alumina, such as gamma phase alumina or a combination of gamma phase and delta phase, or gamma, delta and theta phase alumina, or delta and theta phase.

Calcination may be carried out in various environments including controlled gas and pressure environments. Because calcination is generally carried out to effect phase changes in the boehmite particulate material and not chemical reaction, and since the resulting material is predominantly an oxide, specialized gaseous and pressure environments need not be implemented except for most compositionally and morphologically controlled alumina end products.

According to one particular feature, the morphology of the boehmite particulate material is largely maintained in the feedstock particulate material. Accordingly, desirable morphological features may be engineered into the boehmite according to the foregoing teaching, and those features are substantially preserved in the as-formed transition alumina particulate material. For example embodiments have been shown to retain at least the specific surface area of the boehmite particulate material, and in some cases, increase surface area by amount of at least 8%, 10%, 12%, 14% or more. Since morphology is largely preserved in the as-formed transition alumina, the foregoing description in connection with morphological features of the boehmite particulate material is equally applicable to the transition alumina material as well.

According to one embodiment, the feedstock particulate material is then milled. The thus calcined and milled particulate material may be described herein as abrasive particulate material. Embodiments of abrasive particulate material may have a notable amorphous content, as well as controlled density and refined particle size as described below.

According to one embodiment, the feedstock particulate material is wet milled in an acidic environment to maintain stability and avoid gellation of the particles. The pH of the slurry for wet milling is generally not greater than about 5.0, such as not greater than about 4.5. Typically, pH is greater than about 2.0, with various working embodiments within a range of about 3.5 to 4.0. Various acids may be used to ensure the desired pH. Nitric acid is a particularly suitable acid.

The abrasive particulate material can be dried after wet-milling. A variety of drying methods may be used, such as freeze-drying or any form of drying that does not substantially alter the characteristics of the powder. The dried particulate material may be dispersed immediately after drying to form a slurry, or alternatively, the dry powder can be stored and/or shipped and dispersed at a later time to form a stable slurry. The dried particulate material may be stored for extended periods of time in a dried or freeze-dried state, and may be dispersed in a liquid medium to provide a stable slurry. The ability to form a stable slurry after long durations of dry storage facilitates packaging and shipment of a powder without the additional concerns of including a solvent and/or stabilizing additives. In addition, the particles of the present invention can be made highly stable and may therefore be shipped without any sedimentation.

Additional processing of the milled abrasive particulate material may be undertaken to further modify the particle characteristics. For example, the abrasive particulate material may undergo an ion exchange procedure to alter the dry powder density. For example, one particular ion exchange procedure includes combining the milled abrasive particulate material with a resin, such as IONAC® in a weight ratio of about 1:1.005, at a pH of 4, and mixing the combination of materials for a duration of 12 hours. After mixing the abrasive particulate material the particles are sieved and the resultant abrasive particulate material has a dry powder density greater than the milled abrasive particulate material.

According to one embodiment, the abrasive particulate material contains two principal components, transition alumina and an aluminous (such as aluminum oxide) amorphous phase. According to one embodiment, the percentage of the amorphous phase present in the alumina particles is not less than about 5.0 wt %, such as not less than about 10 wt %, 20 wt %, 25 wt % or even 30 wt %. The content of the amorphous phase is generally limited so as to form a minority component, that is, less than about 50 wt %. Typically, this amorphous content is not greater than about 45 wt % or even not greater than about 40 wt %. For example, the amorphous phase may be present in a range between not less than about 5.0 wt % and less than about 40 wt %. Other embodiments may lie within a narrower range, such as amorphous phase content between about 10 wt % and about 40 wt % or even in a range between about 20 wt % and about 40 wt %.

Turning to the transition alumina, this crystalline phase is generally formed of at least one of or a combination of transition alumina phases: chi, kappa, gamma, delta and theta. Generally, the transition alumina includes gamma phase, and indeed may be the majority crystalline phase. In one embodiment, the transition alumina is primarily gamma phase. Turning to the overall composition of the material, the alumina particles forming the abrasive particulate material may include not less than about 10 wt % gamma phase alumina, generally not less than about 20 wt % gamma phase. Further, the transition alumina may include other phases, notably theta phase. In embodiments containing theta phase, generally gamma remains as the majority crystalline phase. The alumina particles forming the abrasive particulate material may include not less than about 5 wt % theta phase alumina, such as less than about 10 wt % theta phase. Additionally, the presence of gamma phase alumina may also include the presence of delta phase alumina, depending upon the calcining temperature, such that at calcining temperatures above about 1000° C. the delta phase and gamma phase are indistinguishable to some characterization techniques.

The alumina particles forming the abrasive particulate material generally include the amorphous phase in a complementary amount to the crystalline transition phase(s), such that the transition crystalline phase(s) and the amorphous phase compose the majority content of the particles. Typically, the combination of transition crystalline phases(s) and the amorphous phase composes not less than about 95 wt %, often not less than about 97 wt % or even 99 wt % of the alumina particles forming the abrasive particle material. Typically, it is desirable that the amorphous phase and the transition alumina phases(s) form the entire amount (100 wt. %) of the alumina material. In any event, any remnant components may include impurities such as other phases of alumina (i.e. corundum), metals or other oxides that may be removed through further processing.

According to one particular feature, the alumina particles forming the abrasive particulate material may have a dry powder density not greater than about 3.20 g/cm$^3$, such as not greater than 3.00 g/cm$^3$. Typically, the dry powder density of the alumina particles is not greater than about 2.90 g/cm$^3$, such as not greater than about 2.85 g/cm$^3$, 2.80 g/cm$^3$ or even not greater than about 2.75 g/cm$^3$. Density values are typically not less than about 2.00 g/cm$^3$, such as not less than 2.30 g/cm$^3$ or even 2.40 g/cm$^3$.

Here, it is noted that state of the art abrasive materials including both transition alumina and an amorphous phase are generally of high density. For example, inspection of gamma/amorphous material in accordance with the disclosure of U.S. Pat. No. 5,527,423 reveals a density of about 3.78 g/cm$^3$. It appears that the density of the particulate material is not solely dependent upon the type or amount of phases present and may be attributed to other characteristics. Without wishing to be tied to any particular theory, it is believed that one or a combination of processing parameters may contribute to the comparatively low densities noted above. Such processing parameters may include use of wet milling, pH level, particular acidic species such as nitric acid, and the general calcination-milling approach.

Turning to further characterization, the alumina particles may have a specific surface area not less than about 100 m$^2$/g, such as not less than about 125 m$^2$/g. Particular embodiments have higher specific surface areas, such as not less than 150$^2$/mg, not less than about 160 m$^2$/g, 175 m$^2$/g, 190 m$^2$/g or even 200 m$^2$/g. The specific surface area may have an upper limit such as no the order of 350 m$^2$/g, typically 300 m$^2$/g. The foregoing specific surface areas are measured by the BET technique.

Further, the alumina particles may have an elongated morphology, including particles that are platelet-shaped or needle-shaped, the terms having been defined above with respect to the feedstock particulate material.

According to one embodiment, the primary aspect ratio of the alumina particles is not less than about 3:1. In other embodiments, the alumina particles have a primary aspect ratio not less than about 4:1, 5:1 or even 6:1. Still, other embodiments have particles that are elongated to a greater degree such that the primary aspect ratio is not less than about 9:1 or even 10:1. Referring to the secondary aspect ratio, one embodiment contains needle-shaped particles having a secondary aspect ratio that is not greater than about 3:1, such as not greater than 2:1 or is about 1:1. In another embodiment, the secondary aspect ratio of the alumina particles is not less than about 4:1, 6:1 or even 8:1 denoting a platey morphology.

Continuing to refer to the particle geometry, according to one embodiment, the average primary particle size of the transition alumina particles is not greater than about 85 nanometers (nm). For clarification, the average primary particle size is the measurement of the alumina particles, along their longest axes. Particular embodiments may have an average primary particle size not greater than about 50 nm, or not greater than about 40 nm, or even 30 nm. In the case of anisotropic particulates, the average primary particle size may be determined by taking multiple representative samples and physically measuring the particle sizes found in the representative samples, such as by scanning electron microscopy (SEM). Other particle size characterization techniques may be used particularly for isotropic particulate materials.

While suitable average primary particle sizes facilitate the formation of stable slurries, the average secondary particle size, or the particle size of aggregates also affects the ability of the abrasive particulate material to form stable slurries. A suitable stable slurry is facilitated by uniformly dispersed aggregates throughout the medium. Stable slurries are those suspensions that avoid agglomeration and settling of primary and secondary particles. Consistent with embodiments herein, the particles have a charge sufficient to repel and overcome the van der Waals attractive forces between the particles, thereby avoiding substantial agglomeration.

Accordingly, in one embodiment, the average secondary particle size of the alumina particles is not greater than about 200 nm, such as not greater than about 185 nm, 175 nm, or even not greater than about 165 nm. Still, other embodiments have smaller agglomerates such that the secondary particle size is not greater than about 150 nm. The measurements of the average secondary particle size were taken from representative samples using laser diffraction technique.

According to various embodiments, the abrasive particulate material of the present disclosure is suitable as a dry powder or dispersed in a solvent, to create an abrasive particulate slurry. Dispersion of the abrasive particles forms a slurry suitable for polishing applications such as chemical mechanical planarization (CMP).

According to one embodiment, the alumina particles are dispersed in water to form an aqueous slurry. The amount of solids in the slurry can vary, but generally the solids loading of the slurry is not greater than about 30 wt %. Embodiments have a solids loading not greater than about 15 wt %, and other embodiments have a lower solids loading, such as not greater than about 10 wt %, 5.0 wt % or even 3.0 wt %.

The slurry may contain additives, such as organics and oxidizers, depending upon the intended application of the slurry. In particular applications, such as chemical mechanical planarization (CMP), oxidizers may be added to the slurry to oxidize the material surface of the workpiece to facilitate polishing. According to one embodiment, an oxidizer such as $H_2O_2$ is added to the slurry in an amount not greater than about 10% by weight. Other embodiments utilize an oxidizer in an amount not greater than about 8.0 wt %, 7.0 wt %, or even 5.0 wt %, but typically oxidizer is present in an amount of at least 0.1 wt %.

In some applications, organics are typically added as dispersants, surfactants, binders, or rheological modifiers. Referring to suitable organic additives, glycine may be added to the slurry, such as in an amount not greater than about 5.0 wt %. Still other embodiments contain glycine in an amount not greater than about 4.0 wt %, or even not greater than about 3.0 wt %.

Considering other characteristics of the abrasive slurry, according to one embodiment, the slurry is acidic (pH<7.0). Suitable acidic compounds, such as nitric acid, are effective to control the acidity of the slurry. Other embodiments provide a slurry in which the pH is not greater than about 6.0, 5.0 or even 4.0.

Additionally, the present particulate material provides a high degree of stability in a slurry. For the purposes of this disclosure, the stability of a slurry is defined as the height of sediment formed within a graduated cylinder of fixed dimensions (see below) containing the slurry after a known duration.

Table 1, provided below, summarizes stability of Example 1 (process details provided below) as compared to other commercially available materials. The stability of each of the materials provided in Table 1 is measured by providing a 25 mL slurry in a graduated cylinder of dimensions 24.31×98 mm (inner diameter×height). The height of sediment formed by settling particles is measured for each sample after a known duration. Each slurry includes 3.0 wt % alumina, 5.0 wt % $H_2O_2$, 1.0 wt % glycine and has a pH of about 4.0. As summarized in Table 1, the present slurry of Example 1 has notable stability and, in fact, provides a stable slurry with no evidence of sedimentation over a duration of 6 days (i.e., no visible sedimentation height, 0.0 mm). The slurry is 100% colloidally stable, exhibiting no sedimentation after extended periods, such as 6 days (or even longer). Indeed, long-term observation has revealed that the slurry remains 100% colloidally stable after 15 days, after 30 days, and even after 3 months. During the observations periods, Example 1 was not disturbed, but was allowed to rest untouched. In contrast, none of the commercially available materials achieve such stability, and indeed exhibited settling after just 6 days undisturbed. The ability to form a high-stability slurry facilitates the formation and shipment of a dispersed and ready-to-use slurry without the concern of settling, thus removing the need for mixing before application of the slurry.

TABLE 1

| | Colloidal Stability | | |
|---|---|---|---|
| | 1 day | 5 days | 6 days |
| Example 1 | stable | stable | stable |
| Comparative Example 1 | stable | stable | 0.1-0.5 mm |
| Comparative Example 2 | slightly settled | ~3 mm | ~3.5 mm |
| Comparative Example 3 | stable | 0.1-1.0 mm | 0.1-1.0 mm |
| Comparative Example 4 | stable | 0.1-1.0 mm | ~1 mm |

As stated previously, the comparative examples provided in Table 1 are commercially available materials. Comparative Example 1 is dry powder alumina material obtained from Degussa, lot number 0401050, having an average secondary particle size of 141 nm and a specific surface area of 121.8 $m^2/g$. Comparative Example 2 is a dry powder alumina material obtained from Baikowski, lot number 031560, having an average secondary particle size of 1327 nm and a specific surface area of 105 $m^2/g$. Comparative Example 3 is a dry powder alumina material obtained from Nanophase, lot number AABI1801, having an average secondary particle size of 205 μm and a specific surface area of 38.2 $m^2/g$. Comparative Example 4 is a dry powder alumina material obtained from Cabot, lot number 105164, having an average secondary particle size of 328 nm and a specific surface area of 115.3 $m^2/g$.

According to another aspect, a particulate material is provided that includes alumina particles comprising transition alumina having a turbidity of not greater than about 200 NTU at a concentration of 0.50 wt % alumina particles in water. The turbidity of a slurry is a measure of the opacity of the particles in suspension caused by the scattering of light. One of the units of measurement is the NTU or Nephelometric Turbidity Units. In one embodiment, the alumina particles have a turbidity of not greater than about 150 NTU, such as about 125 NTU, 100 NTU or even not greater than about 95 NTU at a concentration of 0.50 wt % alumina particles in water. Generally, the greater the turbidity of a slurry, the more opaque the suspension due to scattering of light by the suspended particles. The degree of transparency provided by the present particulate material in a slurry facilitates the use of the material in various applications beyond abrasive applications, such as a filler and/or reinforcement materials for incorporation in, for example, polymeric materials for use in coatings (particularly clear coats), flooring materials, hoses, films, packaging materials, and paints.

Table 2 provides a comparison of turbidity measurements of slurries prepared using the present particulate material and commercially available alumina, alumina hydrate (boehmite) and silica powders. The slurries were free of additives, containing particles as noted herein and water (pH adjusted). A DRT-15CE turbidimeter (HF Scientific, Inc. Fort Myers, Fla.) was calibrated using a standard sample and the samples provided in Table 2 were then measured. As reported in Table 2, Example 1 of the present particulate material has a remarkably lower turbidity and consequently a higher degree of transparency at both concentrations when compared to commercially available aluminas and silica. The high transparency effect is associated with the previously discussed particle characteristics and particle morphology, such as the average primary and secondary particle size, as well as the particle shape, density, and compositional characteristics

TABLE 2

| Turbidity Measurement | | |
|---|---|---|
| | 5% Concentration | 0.5% Concentration |
| Comparative Example 7 | 185 NTU | 18 |
| Example 1 | 572 NTU | 86 |
| Comparative Example 5 | >1000 NTU | 302 |
| Comparative Example 3 | >1000 NTU | 885 NTU |
| Comparative Example 1 | >1000 NTU | 970 NTU |
| Comparative Example 2 | >1000 NTU | >1000 NTU |
| Comparative Example 4 | >1000 NTU | >1000 NTU |
| Comparative Example 6 | >1000 NTU | >1000 NTU |

As previously discussed the Comparative Examples contain commercially available materials from various manufacturers. The product specifications of Comparative Examples 1-4 are previously provided in conjunction with Table 1. Comparative Example 5, as shown in Table 2, is colloidal silica (Syton-HT50) obtained from DuPont Air Products Nanomaterials LLC, lot number 1A755H. Comparative Example 6 is alpha alumina material obtained from Saint-Gobain, having an average secondary particle size of 100 nm and a specific surface area of 37 $m^2/g$. Comparative Example 7 is a dry powder Boehmite P2K, obtained from Sasol, lot number 10331, having a specific surface area of 160 $m^2/g$.

According to another aspect, a method of polishing a conductive metal surface is provided that includes providing an abrasive slurry between a workpiece and a platen, the abrasive slurry having abrasive particulate material containing alumina particles as described hereinabove. The method further includes translating the platen and the workpiece relative to each other.

The platen may be translated relative to the workpiece, or the workpiece may be translated relative to the platen or both the platen and the workpiece may be translated. Consistent with typical polishing practices, pressure is applied to the platen, the workpiece, or both, in order to create sufficient friction between the abrasive slurry and the workpiece surface to facilitate removal of material from the surface of the workpiece. In a particular example, the abrasive slurry is suitable for use in chemical mechanical planarization (CMP) applications. As such, the workpiece can include additional or other conductive metals (e.g., copper, aluminum, tungsten), which typically is a component of a semiconductor substrate. Generally, the semiconductor substrate includes conductive material and a dielectric material, the metal layer overlying the dielectric layer. In the context of semiconductor substrates, the method generally further includes continuous polishing of the metal surface to expose an underlying dielectric layer, or portions of an underlying dielectric layer.

EXAMPLES

Example 1

Initially, a feedstock boehmite material, such as P2K, Disperal, Disperal 20, 40 and 60 of Sasol (Sasol, Lake Charles, La.), is calcined or heat treated in air within a temperature range of between about 500° C. to 1250° C., depending upon the desired composition of transition alumina within the precursor transition alumina particles. The calcined powder is milled using a Szegvari attritor (Union process, Akron, Ohio) and milled in deionized water for 2 hours using 0.8 mm $ZrO_2$ media (Tosho, Tokyo, Japan). A secondary milling step is performed using the same attritor with 0.3 mm $ZrO_2$ media (Tosho, Tokyo, JP) for at least 2 hours at 600 fpm. During milling, the pH of the system is acidic, within a range of between about 3.5 to 4.0. The pH is controlled using nitric acid. Alternatively milling can be completed in one step using an attrition mill as described above with 0.8 mm $ZrO_2$ media for 6 hours without a media change. The resulting slurry normally has a solids loading of approximately 25 wt % to 30 wt %. The slurry may be freeze dried and redispersed in deionized water with the same pH, particle size distribution and colloidal stability.

As is generally shown below in Table 3, increasing calcining temperatures increases the crystallinity of the material, with a shift toward higher temperature forms of transition alumina. At elevated calcining temperatures, typically above 1000° C., the formation of delta alumina can occur. For the purposes of Table 3, the gamma alumina and delta alumina transition phases are shown as co-existent phases because the characterization technique was unable to distinguish the precise percentage of each distinct phases.

The amorphous content of the abrasive particulate material formed in Example 1 summarized in Table 3 was measured using XRD analysis with a MgO standard. MgO was used as a standard because of its low mass adsorption coefficient. Blended samples were formed having approximately 50:50 wt % of abrasive particulate material to MgO standard material and mixed for 15 minutes using a SPEX mill. The XRD device was a Philips diffractometer set for conversion to fixed slit type data. A Rietveld analysis was carried out using Siroquant software, which provided an estimated measure of error of about ±10%.

TABLE 3

| | 500° C. | 800° C. | 1000° C. | 1100° C. |
|---|---|---|---|---|
| Amorphous | 39.8 | 36.5 | 22.2 | 17.8 |
| Crystalline | 60.2 | 63.5 | 77.8 | 82.2 |
| Gamma (Delta) | 60.2 | 63.5 | 61.5 | 47.8 |
| Theta | | | 16.3 | 34.4 |

Example 2

Initially, a boehmite feedstock material of P2K from Sasol is calcined at 500° C. for 2 hours to convert a substantial portion of the boehmite to gamma phase alumina. The calcined alumina particles (precursor) is then milled for 6 hours using a Szegvari attritor (Union process, Akron, Ohio) with a 0.8 mm $ZrO_2$ media. The slurry pH is acidic to prevent gellation during milling and the pH is controlled within a range between about 3.5 to 4.0 using nitric acid. The as-milled slurry has a pH within a range of approximately 3.5 to 4.0 which is then freeze dried. The freeze dried slurry can be redispersed without altering its original colloidal characteristics. Upon characterization of the above prepared alumina particles the average secondary particle size was determined to be approximately 150 mm, the average primary particle size was determined to be approximately 20 mm by 5 mm (elongated morphology). The nature of the crystalline structure was determined to be approximately 47 wt. % amorphous and approximately 53% gamma phase alumina. The alumina particles were further determined to have a specific surface area of approximately 220 $m^2/g$ and a density of approximately 2.56 $g/cm^3$.

Referring to FIG. 1, tungsten material removal rate of various abrasive slurries containing alumina particles calcined at different temperatures is compared to the commercially available silica slurries. As illustrated, the material removal rate of the slurries containing alumina particles generally improves as the calcining temperature of the alumina particles increases.

Figure 2:
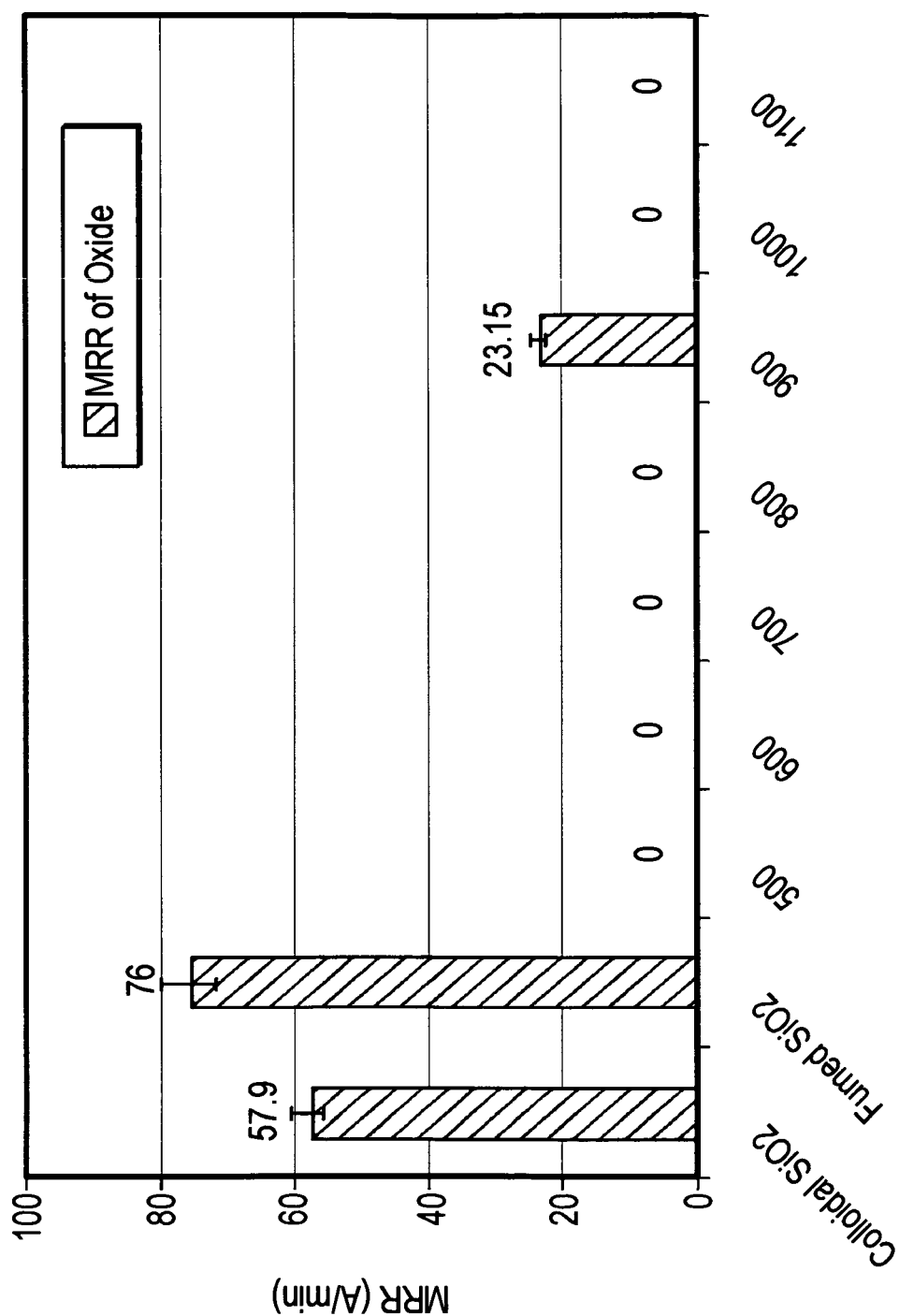
FIG. 2 illustrates a bar graph detailing oxide material removal rates of commercially available silica and a variety of slurries containing alumina particles calcined at different temperatures.

Referring to FIG. 2, dielectric (silica) material removal rate of the same abrasive slurries illustrated in FIG. 1 are compared to the commercially available silica slurries to demonstrate selectivity. FIG. 2 illustrates that the alumina slurries, largely independent of the calcining temperature, have desirably low material removal rates. As shown, the commercial silica slurries have a far greater (undesirable) material removal rate than the slurries containing the alumina particles as described herein.

A comparison of FIG. 1 and FIG. 2 shows that the slurries containing the alumina particles as described herein have a superior selectivity as compared to the commercial silica slurries. The slurries containing the alumina particles are desirably selective and such high selectivity is suitable in various polishing applications, such as CMP in the electronic component processing industry. In light of the foregoing, the slurries containing transition alumina particles, particularly those calcined at or above 800° C. that demonstrate desirable material removal rate and selectivity, are well-suited for various polishing applications.

Figure 3:
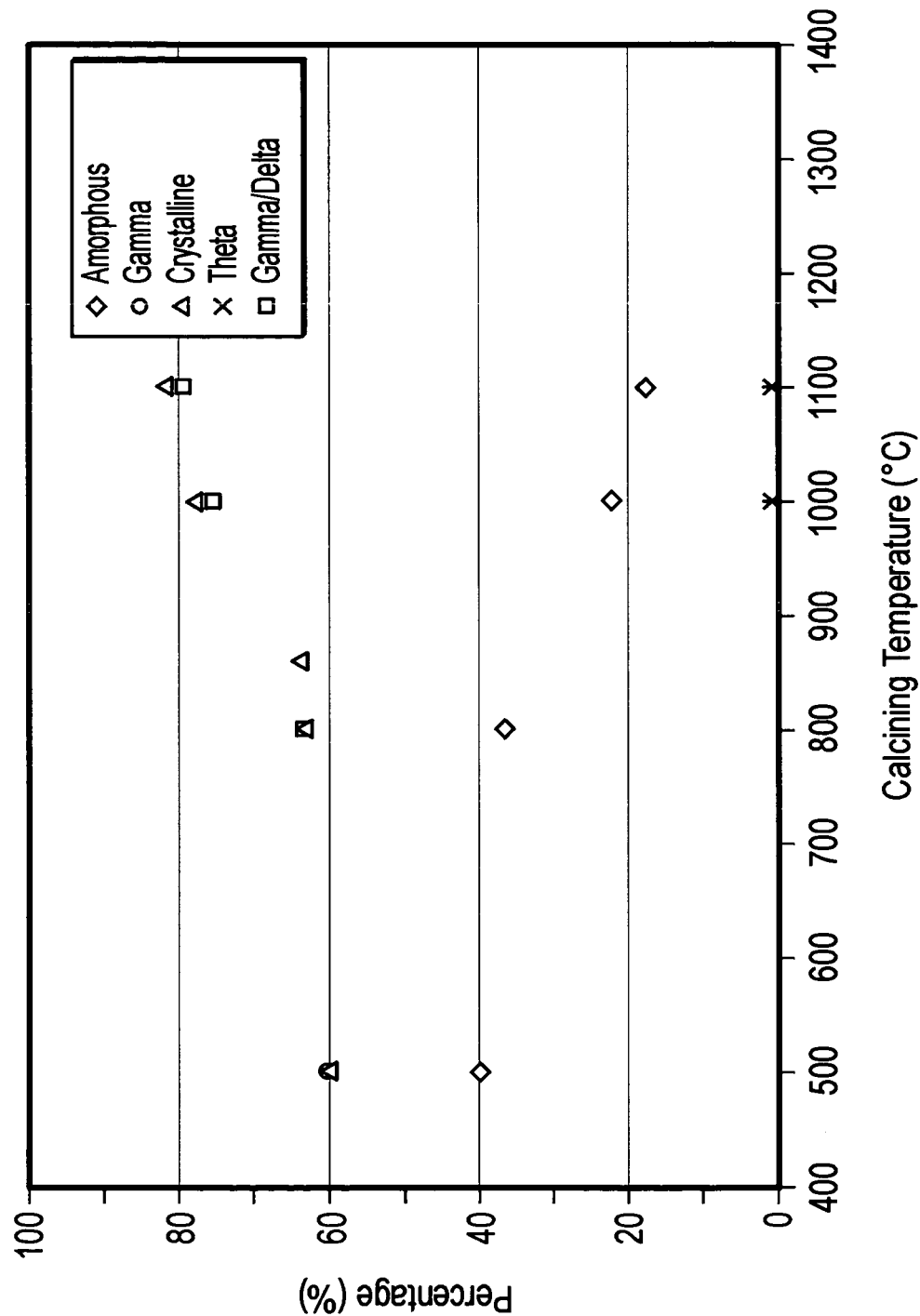
FIG. 3 illustrates a plot of phase percentage of alumina particles as a function of calcining temperature.

Referring to FIG. 3, the percentage of phases present in samples containing alumina particulate material as a function of calcining temperature is illustrated. The samples calcined at a higher temperature generally have a higher percentage of a crystalline phase and demonstrate a decrease in the percentage of amorphous phase present. A theta phase of transition alumina is present in the sample calcined at 1000° C. and the percentage of theta phase increases in the sample calcined at 1100° C., while the amount of gamma phase present decreases. See also the discussion above with respect to the Table.

Figure 4:
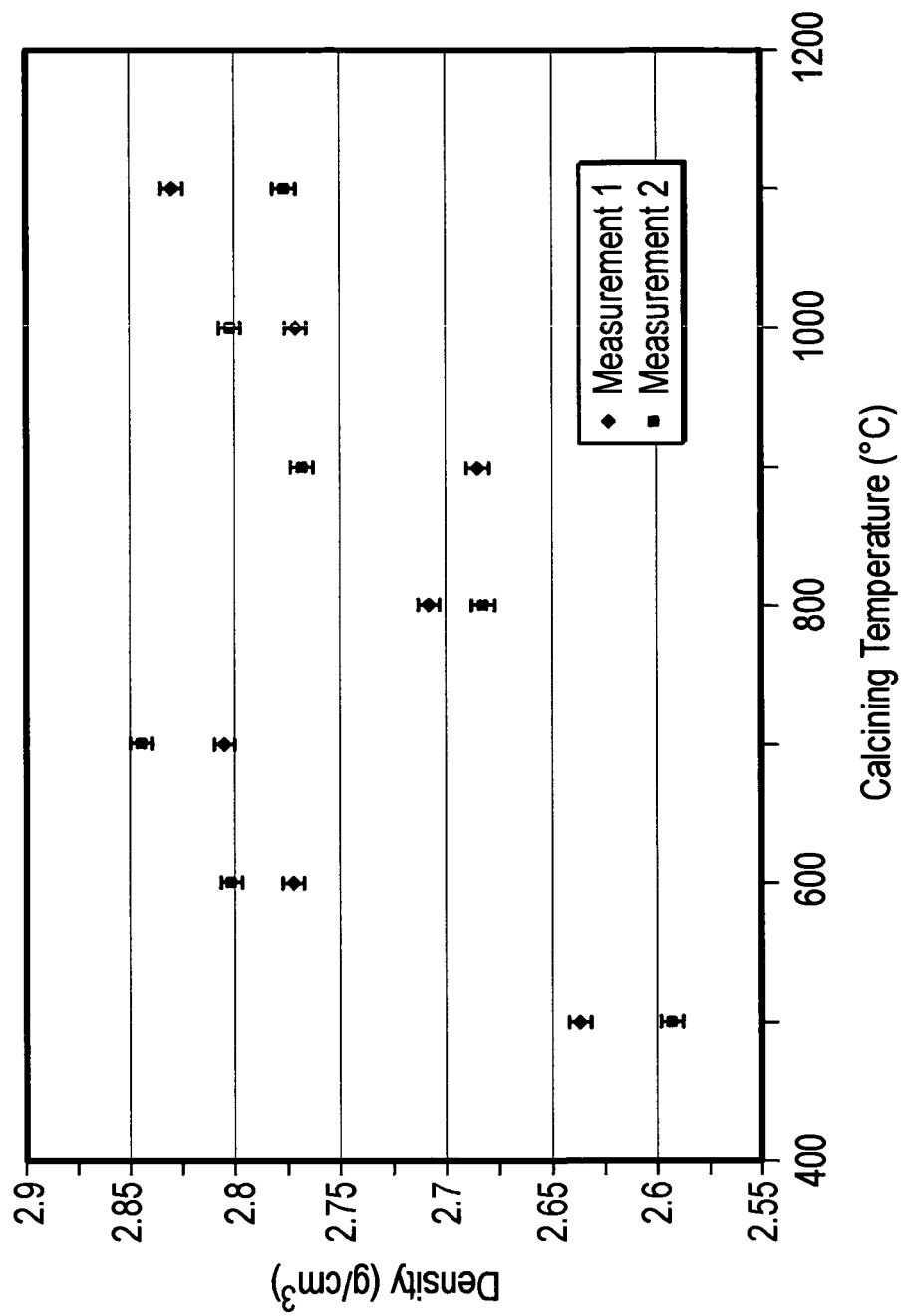
FIG. 4 illustrates a plot the density of alumina particles as a function of calcining temperature.

Referring to FIG. 4, the dry powder density of samples containing alumina material in accordance with the embodiments described herein were measured and illustrated as a function of calcining temperature. The density of each sample was measured by two different groups of technicians (Measurements 1 and 2, respectively). FIG. 4 illustrates a general trend of increasing density of the samples with increasing calcining temperature.

Figure 5:
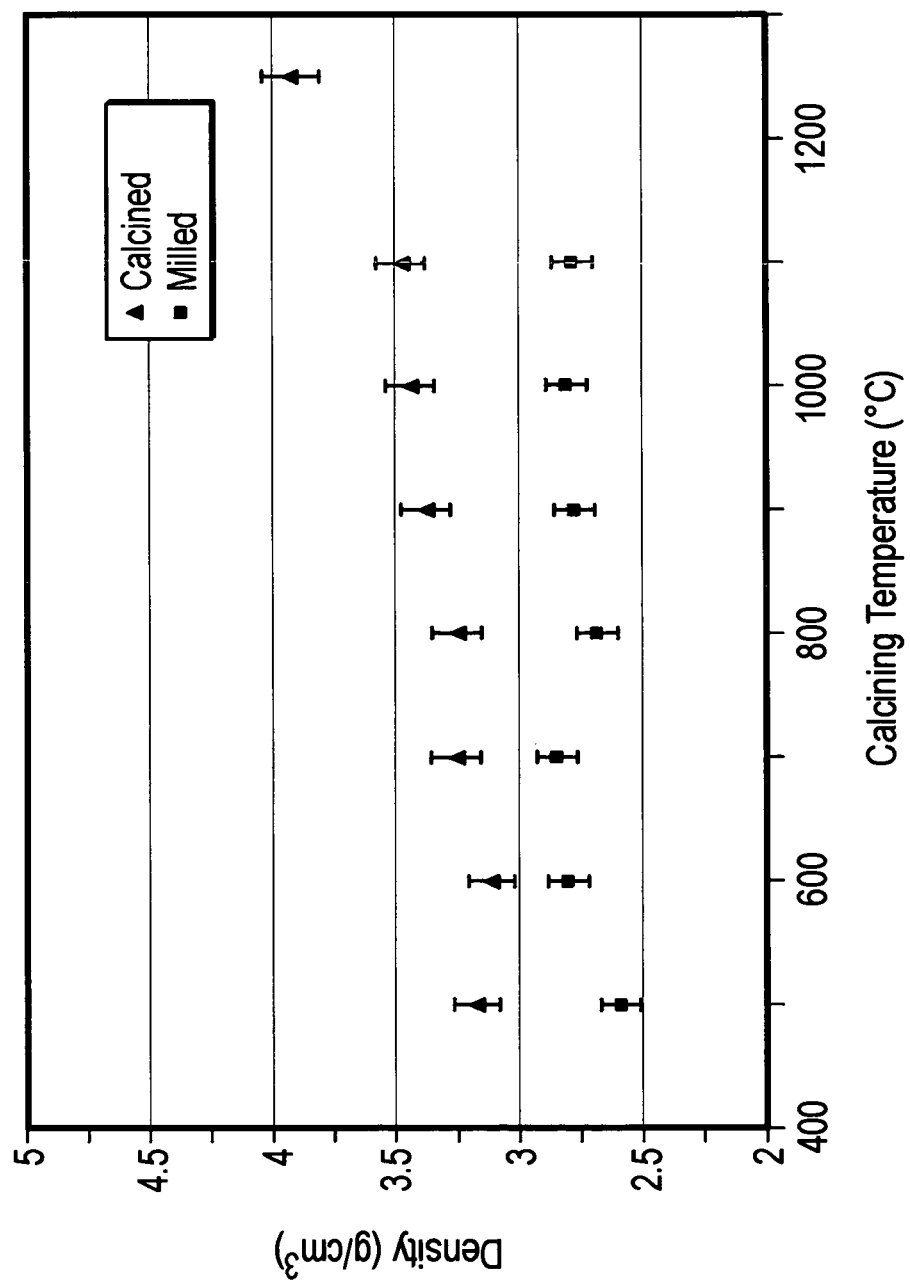
FIG. 5 illustrates a plot of the density of calcined alumina particles and milled and calcined alumina particles as a function of calcining temperature.

FIG. 5 illustrates a plot of the dry powder density of two sets of samples containing alumina material in accordance with the embodiments described herein, as a function of calcining temperature. One set of samples was calcined only, while the other set of samples were calcined and milled. FIG. 5 demonstrates that each of the milled samples had a lower dry powder density than each of the corresponding samples that were unmilled (only calcined) independent of the calcining temperature.

Figure 6:
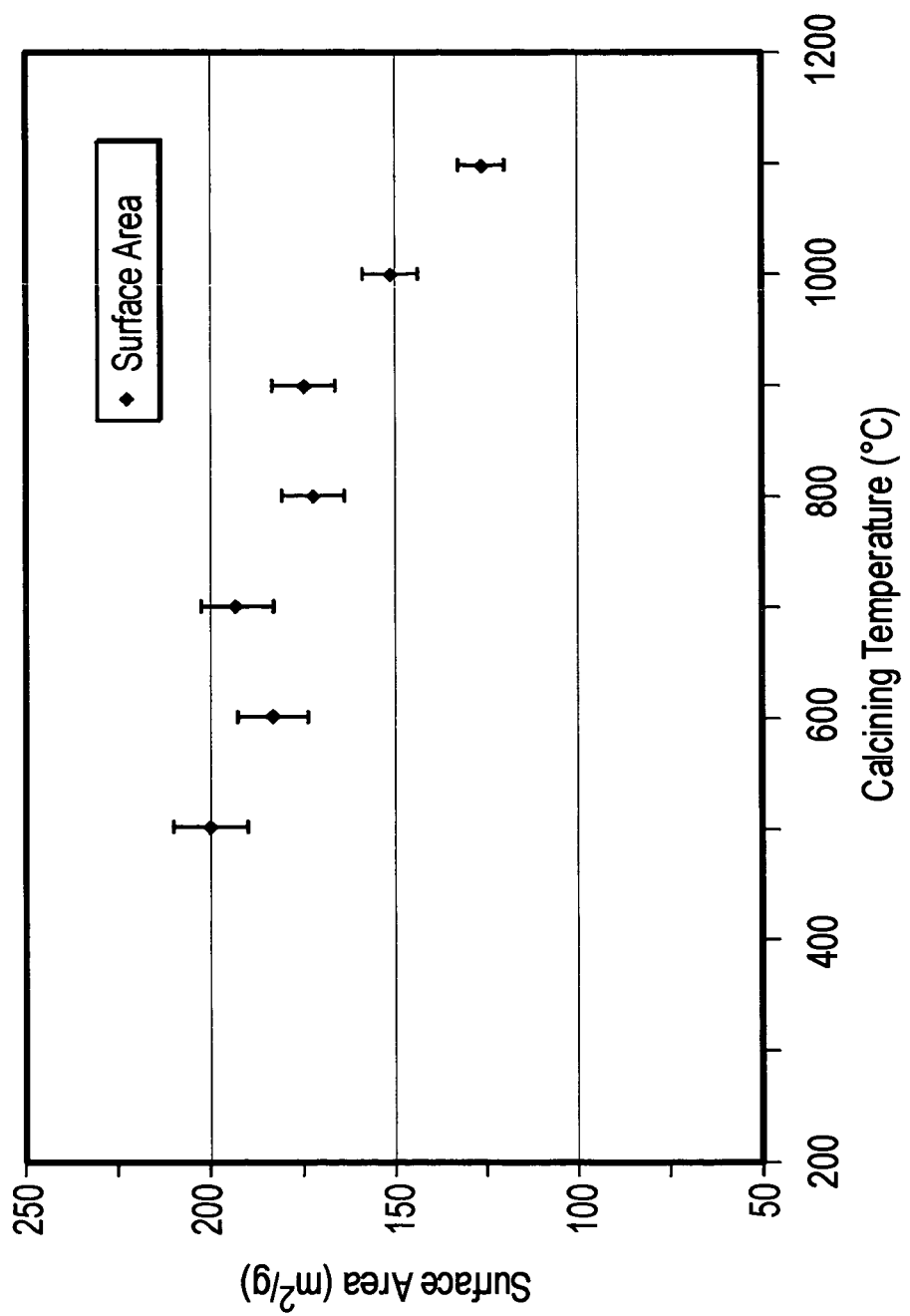
FIG. 6 illustrates a plot of specific surface area of alumina particles as a function of calcining temperature.

Referring to FIG. 6, the specific surface area of samples containing alumina material in accordance with the embodiments described herein is plotted as a function of calcining temperature. FIG. 6 shows a general trend of decreasing specific surface area with increasing calcining temperature. Samples calcined at 700° C. and 900° C. demonstrate a slight differentiation from the general trend, but not outside an accounted standard deviation.

While the invention has been illustrated and described in the context of particular embodiments, it is not intended to be limited to the details shown, since various modifications and substitutions can be made without departing in any way from the scope of the present invention. For example, additional or equivalent substitutes can be provided and additional or equivalent production steps can be employed. As such, further modifications and equivalents of the invention herein disclosed may occur to persons skilled in the art using no more than routine experimentation, and all such modifications and equivalents are believed to be within the scope of the invention as defined by the following claims.

What is claimed is:

1. An abrasive particulate material comprising:
alumina particles comprising transition alumina and at least 5.0 wt % and not greater than about 40 wt % of an amorphous phase, the alumina particles having a density not greater than about 3.00 $g/cm^3$, a primary particle size not greater than about 85 nm, and a specific surface area of not less than about 100 $m^2/g$.

2. The abrasive particulate material of claim 1, wherein the transition alumina comprises at least one of gamma phase alumina and delta phase alumina.

3. The abrasive particulate material of claim 2, wherein the transition alumina comprises delta phase alumina.

4. The abrasive particulate material of claim 2, wherein the alumina particles comprise not less than about 20 wt % gamma phase alumina.

5. The abrasive particulate material of claim 1, wherein the transition alumina comprises theta phase alumina.

6. The abrasive particulate material of claim 5, wherein the alumina particles comprise not less than about 5 wt % theta phase alumina.

7. The abrasive particulate material of claim 1, wherein the alumina particles have a density not greater than about 2.95 $g/cm^3$.

8. The abrasive particulate material of claim 1, wherein the specific surface area is not less than about 125 $m^2/g$.

9. The abrasive particulate material of claim 8, wherein the specific surface area is not less than about 150 $m^2/g$.

10. The abrasive particulate material of claim 1, wherein the alumina particles comprise an elongated morphology.

11. The abrasive particulate material of claim 10, wherein the alumina particles are platelet-shaped, having a primary aspect ratio not less than about 3:1 and a secondary aspect ratio not less than about 3:1.

12. The abrasive particulate material of claim 10, wherein the alumina particles are needle-shaped, having a primary aspect ratio not less than about 3:1 and a secondary aspect ratio not greater than about 3:1.

13. The abrasive particulate material of claim 1, wherein the average primary particle size is not greater than about 40 nm.

14. The abrasive particulate material of claim 1, wherein the alumina particles have an average secondary particle size not greater than about 200 nm.

15. The abrasive particulate material of claim 14, wherein the average secondary particle size is not greater than about 150 nm.

16. The abrasive particulate material of claim 1, wherein the abrasive particulate material comprises a slurry.

17. The abrasive particulate material of claim 16, wherein the slurry has a colloidal stability as determined by a sedimentation height of about 0.0 mm after 3 days.

18. An abrasive particulate material comprising:
 alumina particles comprising transition alumina and at least 5.0 wt % and not greater than about 40 wt % of an amorphous phase, wherein the transition alumina includes theta phase and at least one of gamma phase and delta phase, wherein the alumina particles have a primary particle size not greater than about 85 nm, a density not greater than about 3.00 g/cm$^3$, and a specific surface area not less than about 100 m$^2$/g.

19. The abrasive particulate material of claim 18, wherein the alumina particles comprise not less than about 20% gamma phase alumina.

20. The abrasive particulate material of claim 18, wherein the transition alumina comprises delta phase alumina.

21. The abrasive particulate material of claim 18, wherein a majority of the transition alumina comprises at least one of or a combination of gamma phase and delta phase, the alumina particles comprising 30 to 70 wt % of at least one of or a combination of gamma phase and delta phase, and 5 to 45 wt % theta phase.

22. The abrasive particulate material of claim 18, wherein the alumina particles comprise not less than about 10 wt % and not greater than about 40 wt % amorphous phase.

* * * * *